May 11, 1965 B. E. SOLOMON 3,182,901
COMPRESSOR

Filed Nov. 12, 1963 2 Sheets-Sheet 1

INVENTOR
Benjamin E. Solomon
BY
ATTORNEY

United States Patent Office

3,182,901
Patented May 11, 1965

3,182,901
COMPRESSOR
Benjamin E. Solomon, Columbus, Ohio, assignor to Westinghouse Electric Corporation, Pittsburgh, Pa., a corporation of Pennsylvania
Filed Nov. 12, 1963, Ser. No. 323,001
2 Claims. (Cl. 230—206)

This invention relates to lubrication systems, particularly to such systems for refrigerant motor-compressor units, and has for an object the provision of an improved lubrication system.

While not limited thereto, this invention has been found useful in motor-compressor units for domestic refrigerators, for example, units wherein an electric motor and a compressor driven thereby are hermetically sealed in a shell containing a body of liquid lubricant. The shaft of the motor may include an extension at one end serving as a crankshaft to drive a compressor piston through the usual connecting rod whose bearing rotates on the eccentric portion of the crankhsaft. The shaft may be vertically disposed with its lower end submerged in the body of lubricant and mounted in radial and thrust bearing structure.

The shaft has a longitudinal passage therein for flow of lubricant, offset radially from the shaft axis of rotation, together with lateral passages for delivering lubricant from the offset passage to the various bearings associated with the shaft. Lubricant is centrifugally pumped up the offset passage by a radial passage at the lower end of the shaft which provides communication between the lower end of the offset passage and the body of lubricant, at the center of the shaft.

The above described centrifugal pumping action may be supplemented by provision of a spiral groove pump formed on the lower terminal portion of the shaft to boost the pressure of lubricant in the lubrication system.

Both of the above mentioned lubrication pumping means have been utilized heretofore, and the present invention is concerned with elimination of the failure of lubrication systems due to the presence of refrigerant gas in the lubricant. Refrigerant gas may be present in the body of lubricant for various reasons, perhaps the most important of which is the practice of intentionally stirring, agitating or otherwise treating the body of lubricant to create therein a large quantity of gas bubbles to reduce the ability of the body of lubricant to transmit noise from the motor-compressor unit to the shell.

The presence of such gas bubbles in the lubricant reduces the efficiency of the pumping means due to the reduced density of the lubricant and may cause failure of oil delivery.

An object of the present invention is to eliminate failure of lubrication systems due to the presence of gas in the lubricant.

Another object of the invention is to improve the efficiency of pumps in lubrication systems by increasing the density of the lubricant pumped.

Yet another object of the invention is to separate gaseous bubbles from a lubricant being pumped in a lubrication system.

The foregoing and other objects are effected by the invention as will be apparent from the following description taken in connection with the accompanying drawings, forming a part of this application, in which.

Figure 1:
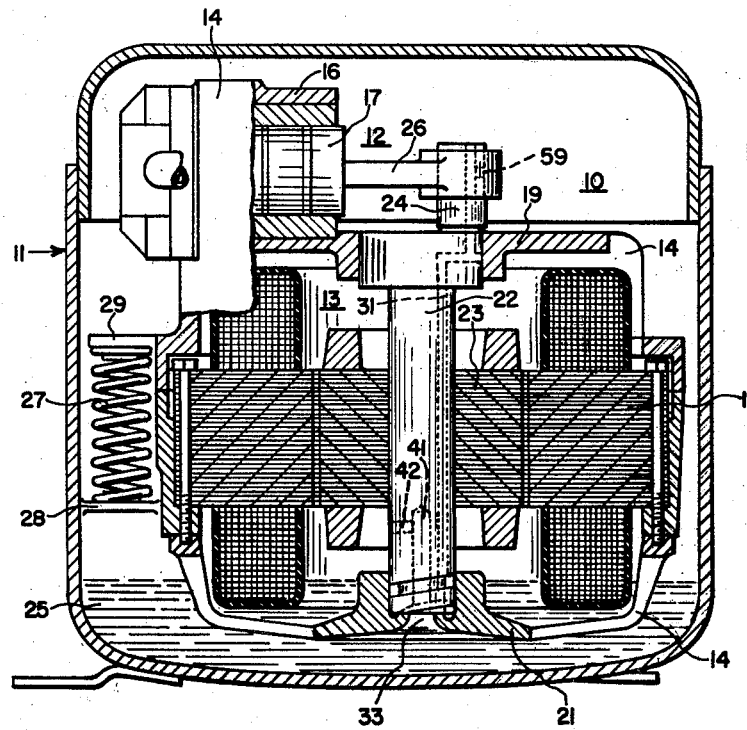
FIG. 1 is a transverse sectional view through a motor-compressor unit incorporating the present invention.
Figure 2:
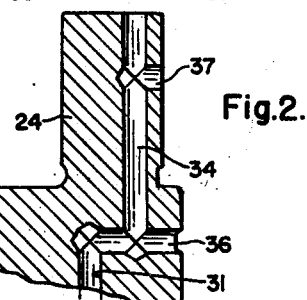
FIG. 2 is an enlarged elevational view, partially in section, of the shaft and lower bearing structure shown in FIG. 1.
Figure 3:
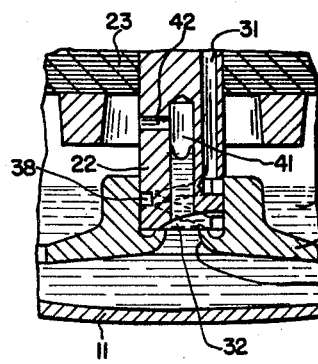
FIG. 3 is an enlarged fragmentary view, partially in section, showing a portion of the structure illustrated in FIG. 1.
Figure 4:
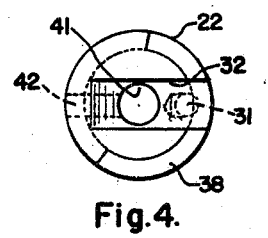
FIG. 4 is a plan view of the lower end of the shaft shown in FIGS. 1, 2 and 3.

Referring in greater detail to FIG. 1, there is shown a motor-compressor unit 10 comprising a shell 11 which provides a hermetically sealed housing for a compressor 12 and an electric motor 13 which drives the compressor. A frame 14 supports a cylinder 16 of the compressor 12, in which cylinder a piston 17 is mounted for reciprocation. The frame 14 also supports a stator 18 of the motor 13 and bearings 19 and 21 for the shaft 22 of the motor rotor 23. The lower bearing 21 is shown as a combined radial and thrust bearing.

The shaft 22 has an upwardly extending offset portion 24 functioning as a crankshaft for imparting reciprocatory motion through a connecting rod 26 to the compressor piston 17.

The frame 14 and the motor and compressor unit supported thereby are in turn resiliently supported from the shell 11 by a plurality of compression springs 27 which rest upon lugs 28 on the inner surfaces of the shell 11 and which springs in turn engage the lower surfaces of lugs 29 projecting outwardly from the frame 14.

As is customary in such motor-compressor units, there is provided in the lower portion of the shell 11 a body 25 of lubricant. In order to direct a portion of this lubricant to the various bearing surfaces of the shaft 22 and its crankshaft extension 24, there is provided within the shaft a longitudinally extending lubricant distributing passage 31, offset laterally from the axis of rotation of the shaft. The shaft, which is vertically disposed with its lower terminal portion submerged in the body 25 of the lubricant, has a slot 32 milled in its lower end to provide a radial passage for flow of lubricant from a central opening 33 in the bearing 21 to the lower end of the lubrication distribution passage 31. During rotation of the shaft 22 lubricant will be forced radially outward in the passage 32 by centrifugal action and forced upwardly in the passage 31 and in an offset extension 34 thereof. This passage 31 and its extension 34 are provided with lateral passages 36 and 37, respectively, for flow of lubricant from the passages 31 and 34 to the bearing 19 and the bearing portion of the connecting rod 26 to lubricate the same.

Under some conditions it may be found that the centrifugal force created in the radial passage 32 is insufficient to effect satisfactory flow of lubricant to the uppermost regions to be lubricated, in which event additional pressure may be obtained by the provision of a spiral groove 38 formed in the periphery of the shaft's lower terminal portion, within the region encompassed by the bearing 21, the lower end of this spiral groove communicating with the outer end of the radial passage 32 and the upper end of this spiral groove discharging into the lower end of the offset lubricant-distributing passage 31. Consequently, with this combination of pumping means, there is applied both the centrifugal force of the passages 32, 31, 34, and/or 36 and 37 and the lifting force of the rotating spiral groove 38.

As previously mentioned, it is frequently arranged that gas shall be intentionally directed into the body lubricant for the purpose of decreasing the ability of the lubricant to transmit noise from the motor-compressor unit to the shell during operation of the unit.

One such arrangement for producing foaming or bubbling of the body of lubricant is disclosed in copending application, Serial No. 182,869, filed March 27, 1962, now Patent No. 3,147,914 and assigned to the assignee of the present application. One form of foaming means therein disclosed comprises a member carried by the lower portion of the shaft and provided with fingers which depend into the body of lubricant with the result that, during operation of the unit, the motor shaft rotates the fingers which stir and agitate the body of lubricant, thereby generating large quantities of bubbles of gaseous refrigerant.

While this foaming or bubbling of the body of lubricant is extremely useful and satisfactory as a means of reducing noise transmission, it presents the disadvantage, in some situations, of either reducing the efficiency of the previously described lubricant pumping means or may reduce efficiency to the point where the system completely fails to lubricate the bearings, resulting in injury to the rotating parts of the unit. Consequently, it becomes desirable to separate, insofar as possible, the bubbles of gaseous refrigerant from the lubricant before the latter is pumped to the bearings and the present invention discloses one means for accomplishing this result.

In accordance with this invention, the lower terminal portion of the shaft 22 is provided with a central passage 41 lying along the axis of rotation of the shaft and extending upwardly to a region well above the surface of the body 25 of lubricant. In addition, there is is provided a lateral vent passage 42 providing communication between the upper portion of the passage 41 and the space within the shell 11, above the body 25 of lubricant.

During rotation of the shaft 22 lubricant, containing bubbles of gaseous refrigerant, rises through the central opening 33 of the lower bearing 21 into the lower end of the central passage 41, whereupon separation of the gaseous bubbles and the solid droplets or particles of lubricant occurs. The centrifugal force imparted to the lubricant in the region where the central passage 41 and radial passage 32 coincide throws the relatively heavy particles or droplets of lubricant radially outward through the radial passage 32 while the gaseous bubbles, having relatively little density, tend to rise in the central passage 32 to the region thereof with which the lateral passage 42 communicates. Since this passage 42 extends radially outward from the central passage 41, it not only vents the upper portion of the central passage 41, but upon rotation of the shaft it produces a pumping effect tending to evacuate the upper portion of the passage 41 and to withdraw therefrom the gaseous refrigerant accumulating therein.

It will be apparent that with the aid of this separating means, relatively dense lubricant is directed through whatever pumping means is provided and hence such means operates at greater efficency than it would if the gaseous refrigerant were not separated therefrom.

While the lubricant distribution passage 31 has herein been shown as disposed in the shaft 22, it will be apparent that it could be in the form of a fixed tube or passage in stationary structure, leading from the centrifugal pumping passage 32, or from the outlet of the spiral groove 38, to the bearing areas to be lubricated.

Figure 5:
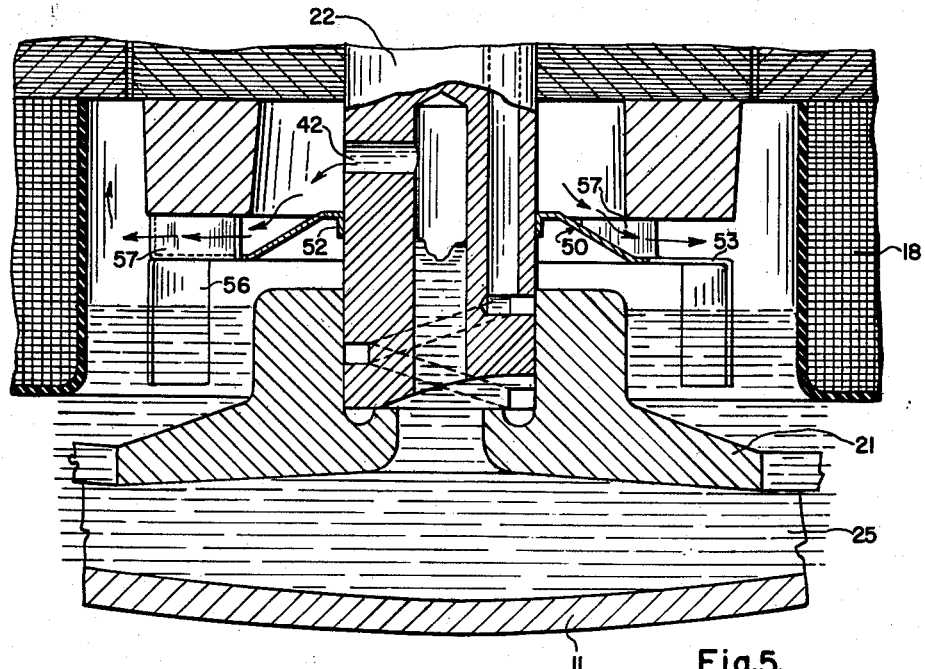
FIG. 5 is an enlarged fragmentary sectional view, similar to FIG. 3, showing an added blower and stirrer element.
Figure 6:
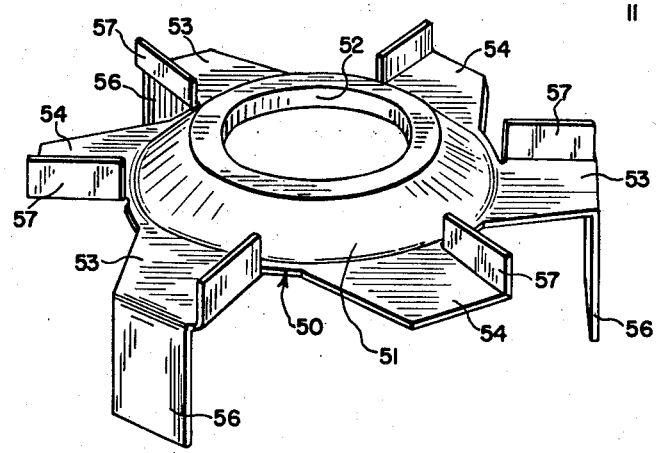
FIG. 6 is a perspective view of the blower and stirrer element.

In FIGS. 5 and 6 there is illustrated another embodiment of the invention, wherein the pumping action effected by the radial vent passage 42, for withdrawing gaseous refrigerant from the upper portion of the passage 41, is augmented by centrifugal fan means 50, carried by the shaft 22 in the vicinity of the vent passage 42.

As herein illustrated, the fan means 50 comprises an inverted cup-shaped disc 51 having a central opening 52 therethrough for press-fit reception of the motor shaft 22. A plurality of arms 53 and 54 extend radially outwardly from the periphery of the disc 51. The arms 53 carry depending lugs or blades 56 at their tips, which blades extend into the body 25 of lubricant to foam or bubble the latter, much is the manner of stirrer disclosed in copending application, previously identified.

The arms 53 alternate with a similar number of the arms 54, and all of the arms have upwardly and radially extending fan blades 57 which, when the motor rotor 23, shaft 22 and fan means 50 rotate as a unit, force air from the space between the rotor and fan means, thereby effecting reduced pressure at the outlet of the vent passage 42.

While the invention has been shown in but one form, it will be obvious to those skilled in the art that it is not so limited, but is susceptible of various changes and modifications without departing from the spirit thereof.

I claim as my invention:

1. In a lubrication system for the bearings of a refrigerant motor-compressor unit hermetically sealed in a shell with a body of liquid lubricant:
   a vertically-disposed shaft adapted to be mounted in said bearings for rotation relative thereto with its lower terminal portion submerged in the body of lubricant said shaft having
   a vertical lubricant-conducting passage therein parallel to, but spaced from, the axis of rotation of said shaft, and having
   lateral passages for conducting lubricant from said vertical passage to said bearings, said shaft also having in its submergible lower terminal portion
   a lateral passage for conducting lubricant to the lower end of said vertical lubricant-conducting passage under centrifugal pressure, and said shaft having
   a passage coaxial with its axis of rotation opening through the lower end of the shaft for communication with the body of lubricant; said coaxial passage extending upwardly in said shaft to a region thereof which will be above the surface of said body of lubricant, and having
   a lateral branch passage to the space within the shell for discharge of refrigerant gas separate from lubricant entering the coaxial passage and means for reducing the pressure in that portion of said space within the shell which is at the outlet of said lateral branch passage.

2. Structure as specified in claim 1, wherein the last-mentioned means comprises a centrifugal fan carried by the shaft.

References Cited by the Examiner

UNITED STATES PATENTS

| | | | |
|---|---|---|---|
| 2,883,101 | 4/59 | Kosfeld | 230—139 X |
| 2,898,072 | 8/59 | Buschmann | 230—206 |
| 2,963,113 | 12/60 | Ayling | 230—206 |
| 3,049,285 | 8/62 | Doeg | 230—206 |

LAURENCE V. EFNER, *Primary Examiner.*

ROBERT M. WALKER, *Examiner.*